United States Patent
Lipton et al.

[11] Patent Number: 5,991,398
[45] Date of Patent: Nov. 23, 1999

[54] TELEPHONE TERMINAL APPARATUS AND METHOD

[75] Inventors: Marc Ira Lipton, Lincolnshire; Robert Derrick Gourdine, Naperville, both of Ill.

[73] Assignee: Ameritech Corporation, Hoffman Estates, Ill.

[21] Appl. No.: 09/062,428

[22] Filed: Apr. 17, 1998

[51] Int. Cl.[6] ...................................................... H04M 3/42
[52] U.S. Cl. .......................... 379/383; 379/165; 379/393
[58] Field of Search ..................................... 379/156, 157, 379/158, 159, 160, 161, 162, 163, 164, 165, 166, 393, 383

[56] References Cited

U.S. PATENT DOCUMENTS

| | | |
|---|---|---|
| 4,133,985 | 1/1979 | Rasmussen et al. . |
| 4,536,621 | 8/1985 | Bergen et al. . |
| 4,650,931 | 3/1987 | Tsukada et al. . |
| 4,756,021 | 7/1988 | Nakayama . |
| 5,195,087 | 3/1993 | Bennett et al. . |
| 5,559,880 | 9/1996 | Shiono . |
| 5,572,575 | 11/1996 | Yamamoto et al. . |
| 5,590,414 | 12/1996 | Marui et al. . |
| 5,764,743 | 6/1998 | Goedken et al. ........................ 379/158 |

*Primary Examiner*—Fan S. Tsang
*Attorney, Agent, or Firm*—Bruce E. Stuckman

[57] ABSTRACT

A telephone apparatus comprises a first audio input device, a second audio input device, a first audio output device, and a second audio output device. The telephone apparatus is operative to couple the first audio input device and the first audio output device to a first telephone line. In response to a first signal, the coupling between the first audio input device and the first telephone line is modified, and the second audio input device and the second audio output device are coupled to a second telephone line.

41 Claims, 4 Drawing Sheets

TELEPHONE TERMINAL APPARATUS AND METHOD

TECHNICAL FIELD

The present invention relates to telephone terminal apparatus and methods.

BACKGROUND OF THE INVENTION

In many business situations, individuals are required to participate in conference calls with two or more other parties. Oftentimes, a significant time period of being a passive participant in a conference call is expended by an individual. In some cases, for example, the active participation of the individual is not required at all in the conference call. In other cases, the individual is a passive participant for time periods in which other parties communicate in the conference call. At other times in either a conference call or a two-party call, the individual is placed on-hold for a significant time period. During these time periods, the individual is limited in his/her ability to conduct additional business calls.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention provide an enhanced feature telephone set which allows an end user to simultaneously manage two separate telephone conversations with at least two separate parties. The apparatus allows an in-process, first telephone call to be placed in a passive, monitor mode so that a concurrent second telephone call can be placed. Using the apparatus, an end user can manage periods of being either on-hold or a passive participant in the first telephone call.

Figure 1:
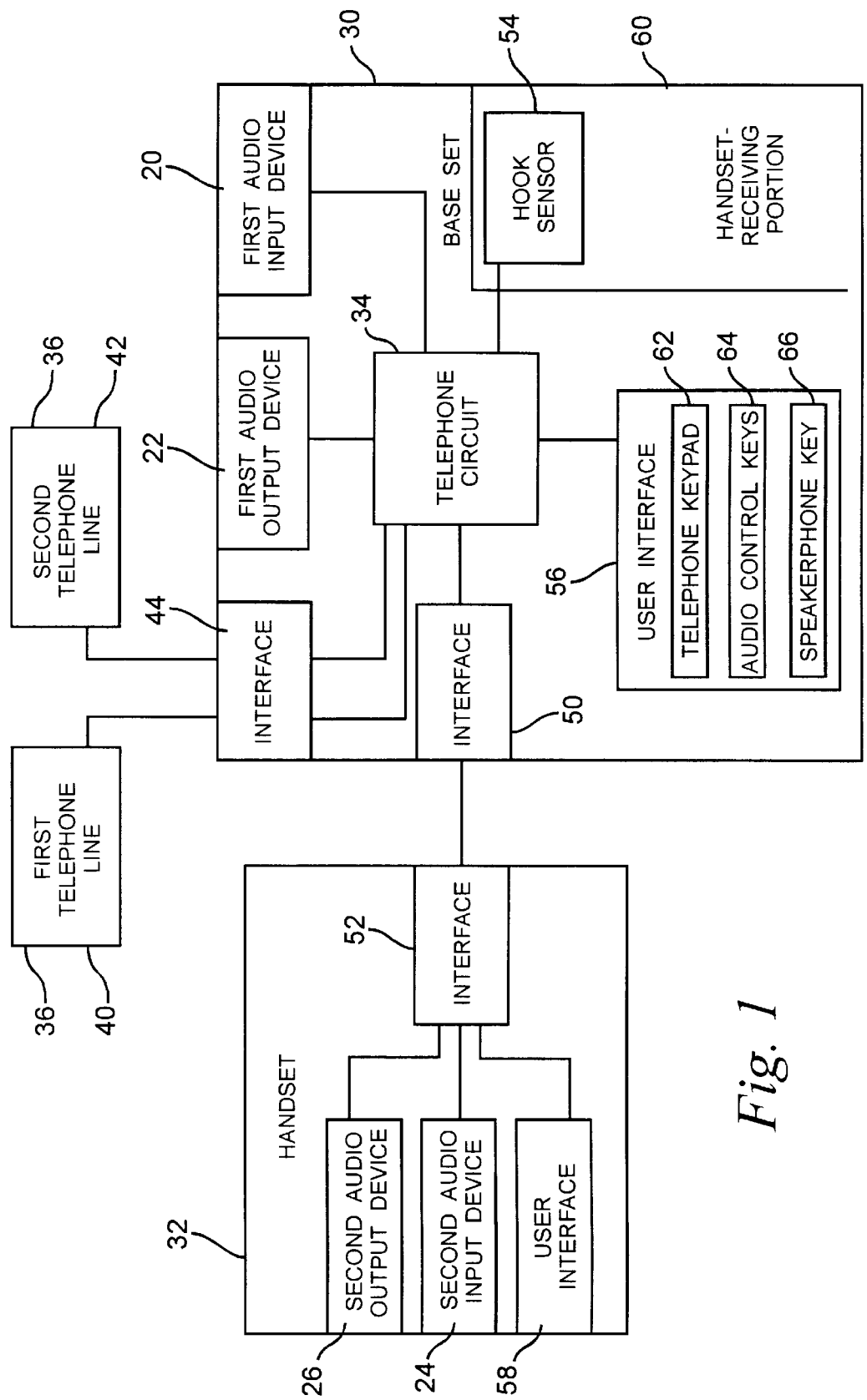
FIG. 1 is a block diagram of an embodiment of a telephone terminal apparatus in accordance with the present invention.

FIG. 1 is a block diagram of an embodiment of a telephone terminal apparatus in accordance with the present invention. The telephone terminal apparatus comprises a first audio input device 20, a first audio output device 22, a second audio input device 24, and a second audio output device 26. Each of the first audio input device 20 and the second audio input device 24 comprises a microphone or a like transducer to generate electrical signals based upon audible acoustic pressure waves sensed thereby. Each of the first audio output device 22 and the second audio output device 26 comprises a speaker or a like transducer to generate audible acoustic pressure waves based upon electrical signals applied thereto.

Preferably, the first audio input device 20 and the first audio output device 22 provide a hands-free audio interface for the telephone terminal apparatus. In exemplary embodiments, the first audio input device 20 and the first audio output device 22 are utilized to provide a speakerphone audio interface for the telephone terminal apparatus. As illustrated, the first audio input device 20 and the first audio output device 22 can be integrated or otherwise associated with a base set 30 of the telephone terminal apparatus. Alternatively, the first audio input device 20 and the first audio output device 22 can be included in an attached speakerphone unit external to the base set 30.

It is preferred that the second audio input device 24 and the second audio output device 26 be integrated or otherwise associated with a handset 32 of the telephone terminal apparatus. As alternatives to the handset 32, the second audio input device 24 and the second audio output device 26 can be associated with either a headset or another member which typically contacts an end user of the telephone terminal apparatus.

A telephone circuit 34 selectively couples, uncouples, and modifies couplings between a plurality of telephone lines 36 and the first audio input device 20, the first audio output device 22, the second audio input device 24, and the second audio output device 26. The plurality of telephone lines 36 include at least a first telephone line 40 and a second telephone line 42. Preferably, the first telephone line 40 includes a first plain-old telephone service (POTS) line, and the second telephone line 42 includes a second POTS line. Although optional, it is also preferred that the second telephone line 42 include an on-demand line.

The telephone circuit 34 is coupled to the first telephone line 40 and the second telephone line 42 by an interface 44. The interface 44 can include one or more connectors to receive mating connectors associated with the first telephone line 40 and the second telephone line 42. For example, the interface 44 can include a pair of RJ11 jacks to receive a corresponding RJ11 plug from each of the telephone lines 40 and 42. Alternatively, the interface 44 can include a single RJ14 jack to receive a single RJ14 plug carrying both of the telephone lines 40 and 42.

The telephone circuit 34 is coupled to the second audio input device 24 and the second audio output device 26 by an interface 50 and an interface 52. The interface 50 is integrated or otherwise associated with the base set 30. The interface 52 is integrated or otherwise associated with the handset 32. The interfaces 50 and 52 can include wireline interfaces, such as RJ11 interfaces, to couple a cable/wireline therebetween. Alternatively, the interfaces 50 and 52 can include wireless interfaces, such as radio frequency transceivers, to wirelessly communicate signals therebetween. In this case, for example, the handset 32 can communicate with the base set 30 as with a conventional cordless telephone.

The telephone circuit 34 is responsive to a hook switch 54 or like hook sensor, a user interface 56, and optionally, a user interface 58. As illustrated, the hook switch 54 can be actuated proximate to a handset-receiving portion 60 of the base set 30. Preferably, the handset-receiving portion 60 has the form of a cradle to receive and support the handset 32. Typically, although not necessary, the hook switch 54 is located at a portion of the cradle for supporting an ear end of the handset 32. When the handset 32 is supported by the handset-receiving portion 60, the hook switch 54 is depressed to indicate an on-hook condition. When the handset 32 is removed from the handset-receiving portion 60, the hook switch 54 is released to indicate an off-hook condition. As either an alternative to or in addition to being proximate to the handset-receiving portion 60, the hook switch 54 can include a key or a like control which is user-selectable.

Preferably, the user interface 56 includes a dialing interface such as a telephone keypad 62, audio control keys 64, and a speakerphone key 66. The user interface 58 can include any subset of the controls of the user interface 56.

The telephone keypad 62 includes dialing digit keys of "0" to "9", a "*" key, and a "#" key. Preferably, the telephone keypad 62 directs the generation of dual-tone multi-frequency (DTMF) signals. Signals generated in response to the telephone keypad 62 are selectively applied to one of the first telephone line 40 and the second telephone line 42 by the telephone circuit 34.

The audio control keys 64 preferably includes volume controls to control the intensity of the audible signals generated by the first audio output device 22. The telephone circuit 34 can include a variable-gain amplifier whose gain is varied based upon the volume controls. Typically, the volume controls include a first key to command an increased volume and a second key to command a decreased volume.

The speakerphone key 66 directs the telephone circuit 34 to initiate at least one speakerphone mode. A first speakerphone mode can be initiated by depressing or otherwise selecting the speakerphone key 66 either: (i) prior to outdialing to the first telephone line 40 using the telephone keypad 62; or (ii) to answer an incoming call from the first telephone line 40. In the first speakerphone mode, the telephone circuit 34: (i) couples the first audio input device 20 and the first audio output device 22 to the first telephone line 40; (ii) makes the first telephone line 40 responsive to the telephone keypad 62; (iii) maintains the second audio input device 24 and the second audio output device 26 to be substantially uncoupled from the first telephone line 40; (iv) maintains the second telephone line 42 to be substantially uncoupled with the audio input devices 20 and 24, the audio output devices 22 and 26, and the telephone keypad 62; (v) provides an off-hook condition with respect to the first telephone line 40; and (vi) provides an on-hook condition with respect to the second telephone line 42. By performing the aforementioned steps, an end user can communicate in a hands-free/speakerphone manner for a first call associated with the first telephone line 40.

From the first speakerphone mode, the telephone circuit 34 initiates a second speakerphone mode in response to receiving a signal from the hook switch 54. It is noted that the handset 32 is typically supported within the handset-receiving portion 60 when in the first speakerphone mode. In this case, the second speakerphone mode is initiated in response to removing the handset 32 from the handset-receiving portion 60 (which, in turn, releases the hook switch 54).

In the second speakerphone mode, the telephone circuit 34: (i) modifies the coupling between the first audio input device 20 and the first telephone line 40; (ii) couples the second audio input device 24 and the second audio output device 26 to the second telephone line 42; (iii) makes the second telephone line 42 responsive to the telephone keypad 62; (iv) maintains the off-hook condition with respect to the first telephone line 40; and (v) initiates an off-hook condition with respect to the second telephone line 42. Preferably, the telephone circuit 34 modifies the coupling by either uncoupling, muting, or otherwise attenuating the coupling between the first audio input device 20 and the first telephone line 40.

By performing the aforementioned steps, the first call is placed in a passive monitoring condition so that a concurrent outbound second call can be placed. In the passive monitoring condition, the end user can continue to hear the audio from the first call using the first audio output device 22, but is inhibited from actively participating in the conversation. The audio volume of the conversation in the first call can be user-modified by use of the audio control keys 64. A dial tone from the second telephone line 42 is provided and made audible by the second audio output device 26. The end user can proceed to out-dial using the telephone keypad 62 to initiate the second call with the second telephone line 42. The second audio input device 24 and the second audio output device 26 provide the audio interface for the second call. Hence, the end user can simultaneously converse or otherwise conduct the second call while monitoring the first call.

When the second call is terminated by direct depression of the flash hook switch 54 or replacement of the handset 32 to the handset-receiving portion 60, the telephone circuit 34 returns to the first speakerphone mode. In particular, the telephone circuit 34: (i) modifies the coupling between the first audio input device 20 and the first telephone line 40; (ii) makes the first telephone line 40 responsive to the telephone keypad 62; and (iii) initiates an on-hook condition with respect to the second telephone line 42. Preferably, the telephone circuit 34 modifies the coupling by either recoupling or unmuting the first audio input device 20 with the first telephone line 40. By performing the aforementioned steps, the first call is returned to an active mode wherein the end user can actively participate in the conversation using the first audio input device 20.

The telephone circuit 34 is also capable of providing a handset mode. The handset mode can be initiated by removing the handset 32 from the handset-receiving portion 60 (which, in turn, releases the hook switch 54). The handset mode can be initiated either: (i) prior to outdialing to the first telephone line 40 using the telephone keypad 62; or (ii) to answer an incoming call from the first telephone line 40.

In the handset mode, the telephone circuit 34: (i) couples the second audio input device 24 and the second audio output device 26 to the first telephone line 40; (ii) makes the first telephone line 40 responsive to the telephone keypad 62; (iii) maintains the first audio input device 20 and the first audio output device 22 to be substantially uncoupled from the first telephone line 40; (iv) maintains the second telephone line 42 to be substantially uncoupled with the audio input devices 20 and 24, the audio output devices 22 and 26, and the telephone keypad 62; and (v) provides an on-hook condition with respect to the second telephone line. By performing the aforementioned steps, an end user can communicate using the handset 32 for a first call associated with the first telephone line 40.

From the handset mode, the telephone circuit 34 initiates a third speakerphone mode in response to receiving a flash signal from the hook switch 54 (e.g. a quick depression and release of the hook switch 54) or receiving a signal from the speakerphone key 66. In the third speakerphone mode, the telephone circuit 34: (i) uncouples the second audio input device 24 and the second audio output device 26 from the first telephone line 40; (ii) couples the first audio output device 22 to the first telephone line 40; (iii) makes the second telephone line 42 responsive to the telephone keypad 62; (iv) maintains the off-hook condition with respect to the first telephone line 40; and (v) initiates an off-hook condition with respect to the second telephone line 42.

By performing the aforementioned steps, the first call is placed in a passive monitoring condition so that a concurrent outbound second call can be placed. In the passive monitoring condition, the end user can continue to hear the audio from the first call using the first audio output device 22, but is inhibited from actively participating in the conversation. The audio volume of the conversation in the first call can be user-modified by use of the audio control keys 64. A dial tone from the second telephone line 42 is provided and made audible by the second audio output device 26. The end user can proceed to out-dial using the telephone keypad 62 to initiate the second call with the second telephone line 42. The second audio input device 24 and the second audio output device 26 provide the audio interface for the second call. Hence, the end user can simultaneously converse or otherwise conduct the second call while monitoring the first call.

When the second call is terminated by direct depression of the flash hook switch 54 or replacement of the handset 32 to the handset-receiving portion 60, the telephone circuit 34 returns to the first speakerphone mode. In particular, the telephone circuit 34: (i) modifies the coupling between the first audio input device 20 and the first telephone line 40; (ii) makes the first telephone line 40 responsive to the telephone keypad 62; and (iii) initiates an on-hook condition with respect to the second telephone line 42. Preferably, the telephone circuit 34 modifies the coupling by either coupling or unmuting the first audio input device 20 with the first telephone line 40. By performing the aforementioned steps, the first call is returned to an active mode wherein the end user can actively participate in the conversation using the first audio input device 20.

When the second call is terminated by a user-selection of the speakerphone key 66, the telephone circuit 34 returns to the handset mode. In particular, the telephone circuit 34: (i) uncouples the second audio input device 24 and the second audio output device 26 from the second telephone line 42; (ii) couples the second audio input device 24 and the second audio output device 26 to the first telephone line 40; (iii) uncouples the first audio output device 22 from the first telephone line 40; (iv) makes the first telephone line 40 responsive to the telephone keypad 62; and (v) initiates an on-hook condition with respect to the second telephone line 42. By performing the aforementioned steps, the first call is returned to an active mode wherein the end user can actively participate in the conversation using the second audio input device 24.

Preferably, in each of the aforementioned modes, the telephone circuit 34 makes only one of the first audio input device 20 and the second audio input device 24 operational at a time.

Figure 2:
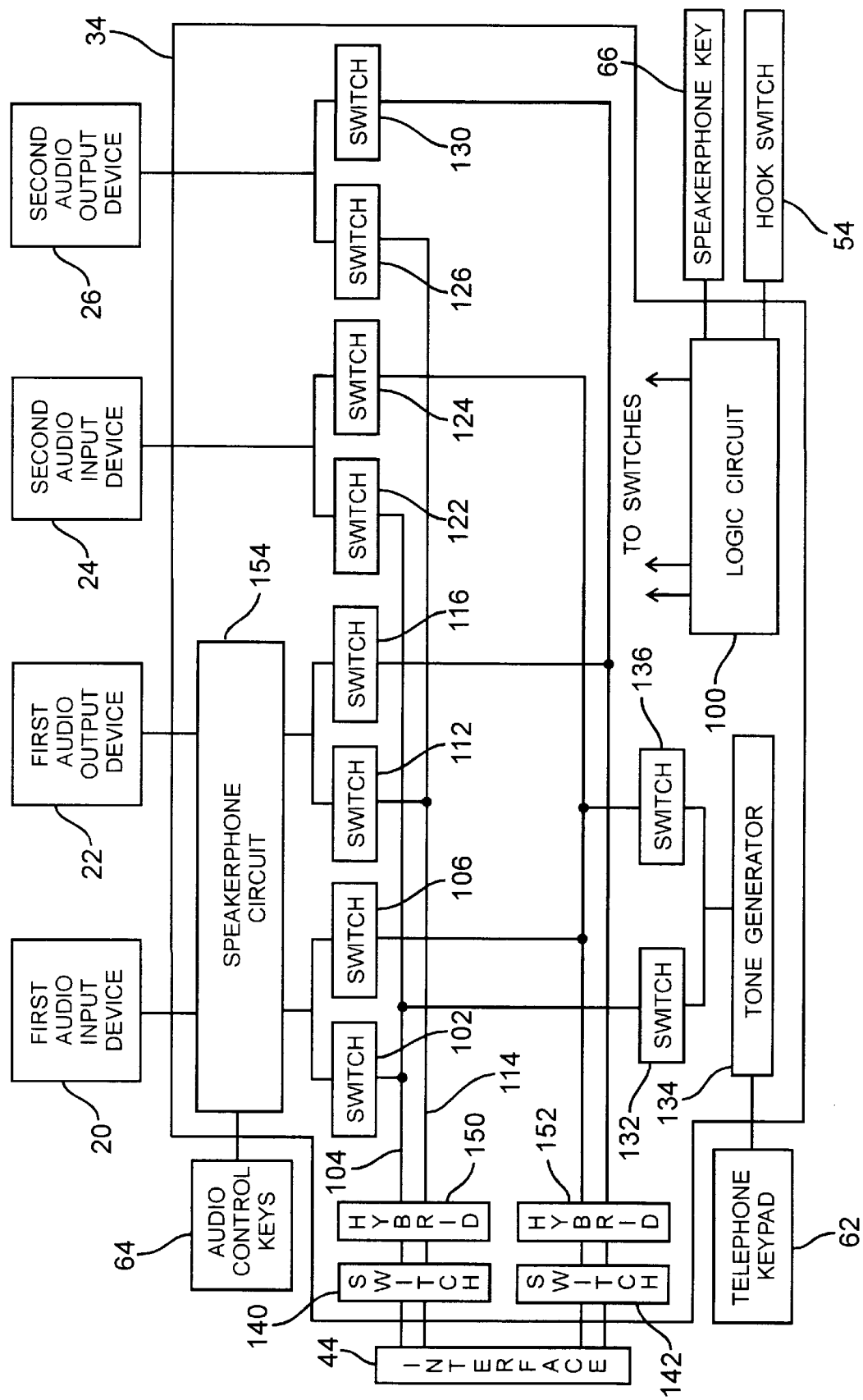
FIG. 2 is a block diagram of an embodiment of the telephone circuit.

FIG. 2 is a block diagram of an embodiment of the telephone circuit 34. To direct the various modes of operation, the telephone circuit 34 includes a logic circuit 100 such as microprocessor, a microcontroller, a programmable logic array, or an application-specific integrated circuit. The logic circuit 100 is responsive to the hook switch 54, the user interface 56, and the optional user interface 58 to determine and initiate the mode of operation.

The telephone circuit 34 includes a plurality of switching devices to selectively couple, uncouple, and modifying couplings between the audio input/output devices and the telephone lines. A switch 102 selectively couples and uncouples the first audio input device 20 to a transmit line 104 associated with the first telephone line 40. A switch 106 selectively couples and uncouples the first audio input device 20 to a transmit line 110 associated with the second telephone line 42. A switch 112 selectively couples and uncouples the first audio output device 22 to a receive line 114 associated with the first telephone line 40. A switch 116 selectively couples and uncouples the first audio output device 22 to a receive line 120 associated with the second telephone line 42.

A switch 122 selectively couples and uncouples the second audio input device 24 to the transmit line 104 associated with the first telephone line 40. A switch 124 selectively couples and uncouples the second audio input device 24 to the transmit line 110 associated with the second telephone line 42. A switch 126 selectively couples and uncouples the second audio output device 26 to the receive line 114 associated with the first telephone line 40. A switch 130 selectively couples and uncouples the second audio output device 26 to the receive line 120 associated with the second telephone line 42.

A switch 132 selectively couples and uncouples a tone generator 134 to the transmit line 104 associated with the first telephone line 40. A switch 136 selectively couples and uncouples the tone generator 134 to the transmit line 110 associated with the second telephone line 42. The tone generator 134 is responsive to the telephone keypad 62 to generate DTMF signals.

A switch 140 selectively provides either an on-hook or off-hook condition for the first telephone line 40. A switch 142 selectively provides either an on-hook or off-hook condition for the second telephone line 42.

The aforementioned switches are responsive to the logic circuit 100. The switches can include solid state switching devices, mechanical relays, or other switching devices.

The first telephone line 40 is coupled to the transmit line 104 and then receive line 114 by a hybrid 150. The second telephone line 42 is coupled to the transmit line 110 and the receive line 120 by a hybrid 152. The hybrids 150 and 152 can include integrated hybrid circuits or transformers as is known in the art.

The first audio input device 20 and the first audio output device 22 are coupled to the switches 102, 106, 112, and 116 by a speakerphone circuit 154. The speakerphone circuit 154 amplifies signals received along either the receive line 114 or the receive line 120 for application to the first audio output device 22. The speakerphone circuit 154 is responsive to the audio control keys 64 to control the intensity or volume of audible signals generated by the first audio output device.

Figure 3:
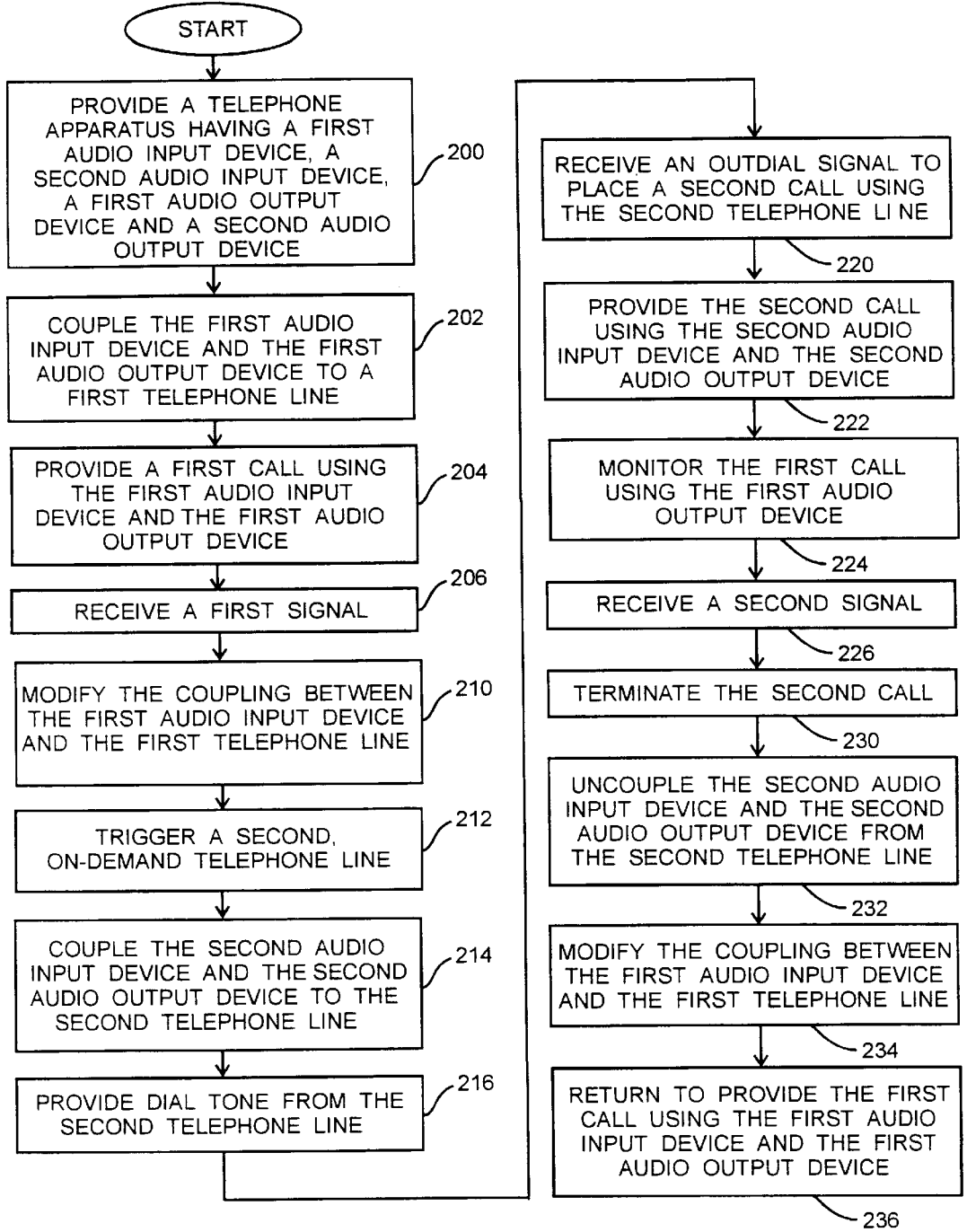
FIG. 3 is a flow chart of an embodiment of a first method in accordance with the present invention.

FIG. 3 is a flow chart of an embodiment of a first method in accordance with the present invention. As indicated by block 200, the method includes a step of providing a telephone apparatus having a first audio input device, a second audio input device, a first audio output device, and a second audio output device. Preferably, this step includes providing a telephone apparatus described with reference to FIGS. 1 and 2, although an alternative telephone apparatus can be utilized.

As indicated by block 202, a step of coupling the first audio input device 20 and the first audio output device 22 to the first telephone line 40 is performed. Preferably, the logic circuit 100 closes the switch 102 to couple the first audio input device 20 to the transmit line 104 associated with the first telephone line 40, and closes the switch 112 to couple the first audio output device 22 to the receive line 114 associated with the first telephone line 40. The logic circuit 110 can further direct that the switch 132 be closed to couple the tone generator 134 to the transmit line 104. Additionally, it is preferred that the logic circuit 100 directs that the switches 106, 116, 122, 124, 126, 130, and 136 be open at this time.

As indicated by block 204, a step of providing a first call using the first audio input device 20 and the first audio output device 22 is performed. The first call is provided using the first speakerphone mode described with reference to FIG. 1. The first call is communicated via the first telephone line 40. Of particular advantage are cases in which the first call is a conference call with three or more participants including the end user.

As indicated by block 206, a step of receiving a first signal is performed. Preferably, the first signal is based upon a signal generated by the hook switch 54 and received by the logic circuit 100. In this case, it is preferred that the first signal be initiated in response to the handset 32 being removed from the handset-receiving portion 60. The end user can initiate the first signal, for example, when he/she is placed on hold in the first call, or when he/she is a passive participant in a conference call.

As indicated by block 210, a step of modifying the coupling between the first audio input device 20 and the first telephone line 40 is performed in response to receiving the first signal. Preferably, the logic circuit 100 opens the switch 102 to uncouple the first audio input device 20 from the transmit line 104. Alternative approaches to muting the first audio input device 20 can be performed in this step. In general, however, the coupling is modified by attenuating the coupling between first audio input device 20 and the first telephone line 40.

As indicated by block 212, a step of triggering a second, on-demand telephone line is performed in response to receiving the first signal. Preferably, the on-demand telephone line is provided by the second telephone line 42. It is noted that triggering an on-demand line is optional since the second telephone line 42 need not be on-demand.

To enable out-dialing to the second telephone line 42, the logic circuit 100 closes the switch 136 to couple the tone generator 134 to the transmit line 110 associated with the second telephone line 42. To inhibit out-dialing to the first telephone line 40, the logic circuit 100 opens the switch 132.

As indicated by block 214, a step of coupling the second audio input device 24 and the second audio output device 26 to the second telephone line 42 is performed in response to receiving the first signal. Preferably, the logic circuit 100 closes the switch 124 to couple the second audio input device 24 to the transmit line 110 associated with the second telephone line 42, and closes the switch 130 to couple the second audio output device 26 to the receive line 120 associated with the second telephone line 42.

As indicated by block 216, a step of providing a dial tone from the second telephone line 42 is performed in response to the first signal. This step can include the logic circuit 100 directing the switch 142 to provide an off-hook condition for the second telephone line 42. As a result, the dial tone is audible by the second audio output device 26.

As indicated by block 220, a step of receiving an out-dial signal is performed. The out-dial signal is received from the end user via the telephone keypad 62, a speed dialing control, or an alternative dialing control. The out-dial signal is communicated to the second telephone line 42 to initiate a second call to be placed.

As indicated by block 222, a step of providing the second call using the second audio input device 24 and the second audio output device 26 is performed. In this step, audible signals sensed by the second audio input device 24 are communicated to the second telephone line 42. Further, the second audio output device 26 generates audible signals based upon signals received from the second telephone line 42.

As indicated by block 224, a step of monitoring the first call using the first audio output device 22 is performed. The first call can be monitored by the end user while concurrently conducting the second call. The end user may monitor the first call either to: (i) determine when he/she is no longer on hold; (ii) determine when he/she is to contribute in the first call; or (iii) monitor a conversation between other parties in the first call.

As indicated by block 226, a step of receiving a second signal is performed. Preferably, the second signal is based upon a signal generated by the hook switch 54 and received by the logic circuit 100. More preferably, the second signal indicates either a manual depression of the hook switch 54 or replacement of the handset 32 to the handset-receiving portion 60.

As indicated by block 230, a step of terminating the second call is performed in response to receiving the second signal. Preferably, the logic circuit 100 directs the switch 142 to provide an on-hook condition for the second telephone line 42 in this step.

As indicated by block 232, a step of uncoupling the second audio input device 24 and the second audio output device 26 from the second telephone line 42 is performed in response to receiving the second signal. Preferably, the logic circuit 100 opens the switch 124 to uncouple the second audio input device 24 from the transmit line 110, and opens the switch 130 to uncouple the second audio output device 26 from the receive line 120.

As indicated by block 234, a step of modifying the coupling between the first audio input device 20 and the first telephone line 40 is performed in response to receiving the second signal. Preferably, the logic circuit 100 closes the switch 102 to recouple the first audio input device 20 to the transmit line 104. In general, however, the coupling is modified by unattenuating or unmuting the coupling between first audio input device 20 and the first telephone line 40.

As indicated by block 236, a step of returning to provide the first call using the first audio input device 20 and the first audio output device 22 is performed. In this step, audible signals sensed by the first audio input device 20 are communicated to the first telephone line 40. Further, the first audio output device 22 generates audible signals based upon signals received from the first telephone line 40.

Figure 4:
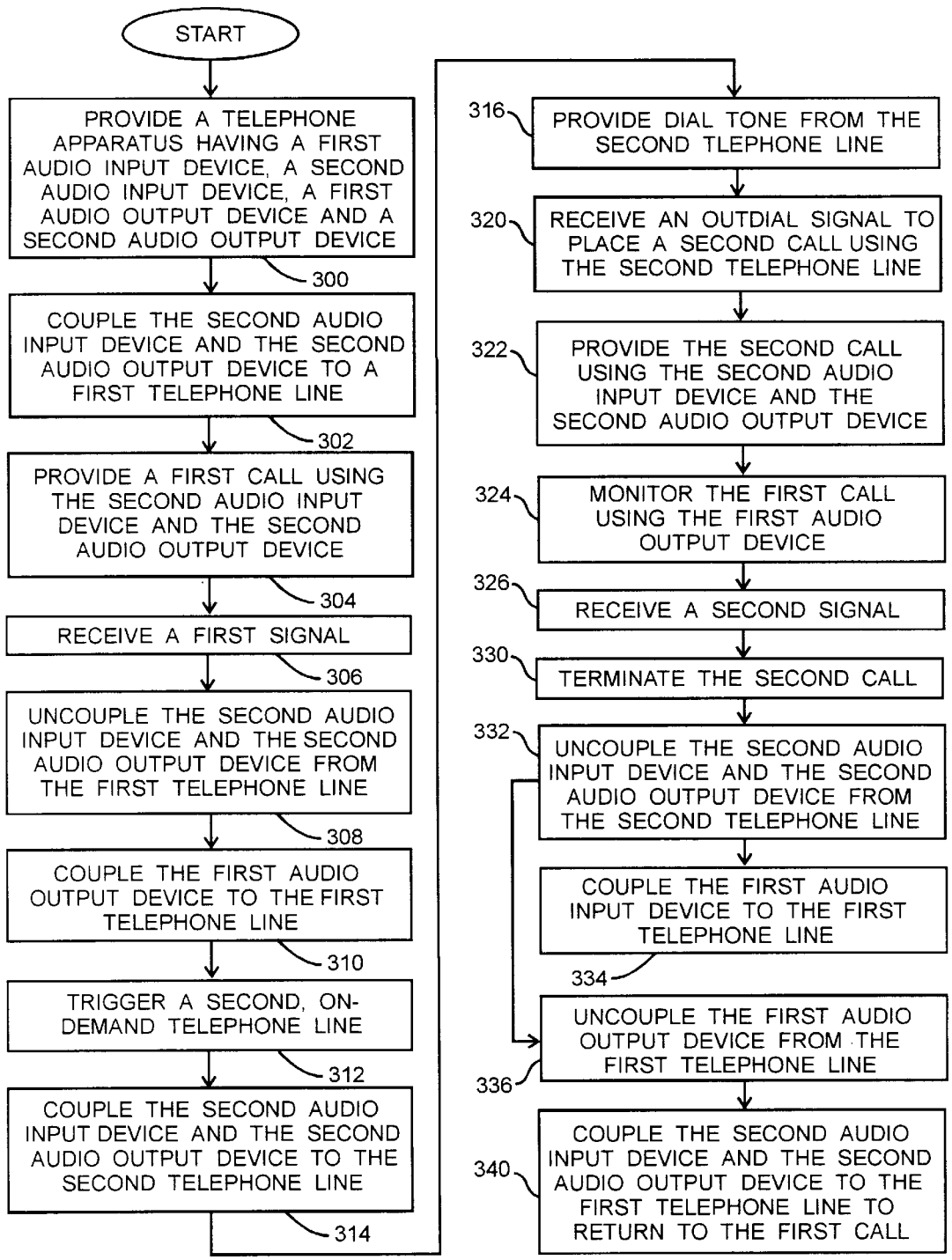
FIG. 4 is a flow chart of an embodiment of a second method in accordance with the present invention.

FIG. 4 is a flow chart of an embodiment of a second method in accordance with the present invention. As indicated by block 300, the method includes a step of providing a telephone apparatus having a first audio output device, a second audio output device, a first audio input device, and a second audio input device. Preferably, this step includes providing a telephone apparatus described with reference to FIGS. 1 and 2, although alternative telephone apparatus can be utilized. It is noted that a flow path for the second method can be performed using a telephone apparatus absent the first audio input device.

As indicated by block 302, a step of coupling the second audio input device 24 and the second audio output device 26 to the first telephone line 40 is performed. Preferably, the logic circuit 100 closes the switch 122 to couple the second audio input device 24 to the transmit line 104 associated with the first telephone line 40, and closes the switch 126 to couple the second audio output device 26 to the receive line 114 associated with the first telephone line 40. The logic circuit 110 can further direct that the switch 132 be closed to couple the tone generator 134 to the transmit line 104. Additionally, it is preferred that the logic circuit 100 directs that the switches 102, 106, 112, 116, 124, 130, and 136 be open at this time.

As indicated by block 304, a step of providing a first call using the second audio input device 24 and the second audio output device 26 is performed. The first call is provided using the handset mode described with reference to FIG. 1. The first call is communicated via the first telephone line 40. Of particular advantage are cases in which the first call is a conference call with three or more participants including the end user.

As indicated by block 306, a step of receiving a first signal is performed. Preferably, the first signal is based upon either a signal generated by the hook switch 54 or a signal generated by the speakerphone key 66. In these cases, the first signal can include a flash signal from the hook switch 54 or a selection of the speakerphone key 66 by the end user. Regardless of its source, the first signal is received by the logic circuit 100. The end user can initiate the first signal, for example, when he/she is placed on hold in the first call, or when he/she is a passive participant in a conference call.

As indicated by block 308, a step of uncoupling the second audio input device 24 and the second audio output device 26 from the first telephone line 40 is performed in response to receiving the first signal. Preferably, the logic circuit 100 opens the switch 122 to uncouple the second audio input device 24 from the transmit line 104, and opens the switch 126 to uncouple the second audio output device 26 from the receive line 114.

As indicated by block 310, a step of coupling the first audio output device 22 to the first telephone line 40 is performed in response to receiving the first signal. Preferably, the logic circuit 100 closes the switch 112 to couple the first audio output device 22 to the receive line 114 associated with the first telephone line 40.

As indicated by block 312, a step of triggering a second, on-demand telephone line is performed in response to receiving the first signal. Preferably, the on-demand telephone line is provided by the second telephone line 42. It is noted that triggering an on-demand line is optional since the second telephone line 42 need not be on-demand.

To enable out-dialing to the second telephone line 42, the logic circuit 100 closes the switch 136 to couple the tone generator 134 to the transmit line 110 associated with the second telephone line 42. To inhibit out-dialing to the first telephone line 40, the logic circuit 100 opens the switch 132.

As indicated by block 314, a step of coupling the second audio input device 24 and the second audio output device 26 to the second telephone line 42 is performed in response to receiving the first signal. Preferably, the logic circuit 100 closes the switch 124 to couple the second audio input device 24 to the transmit line 110 associated with the second telephone line 42, and closes the switch 130 to couple the second audio output device 26 to the receive line 120 associated with the second telephone line 42.

As indicated by block 316, a step of providing a dial tone from the second telephone line 42 is performed in response to the first signal. This step can include the logic circuit 100 directing the switch 142 to provide an off-hook condition for the second telephone line 42. As a result, the dial tone is audible by the second audio output device 26.

As indicated by block 320, a step of receiving an out-dial signal is performed. The out-dial signal is received from the end user via the telephone keypad 62, a speed dialing control, or an alternative dialing control. The out-dial signal is communicated to the second telephone line 42 to initiate a second call to be placed.

As indicated by block 322, a step of providing the second call using the second audio input device 24 and the second audio output device 26 is performed. In this step, audible signals sensed by the second audio input device 24 are communicated to the second telephone line 42. Further, the second audio output device 26 generates audible signals based upon signals received from the second telephone line 42.

As indicated by block 324, a step of monitoring the first call using the first audio output device 22 is performed. The first call can be monitored by the end user while concurrently conducting the second call. The end user may monitor the first call either to: (i) determine when he/she is no longer on hold; (ii) determine when he/she is to contribute in the first call; or (iii) monitor a conversation between other parties in the first call.

As indicated by block 326, a step of receiving a second signal is performed. Preferably, the second signal is based upon either a signal generated by the hook switch 54 or a signal generated by the speakerphone key 66. More preferably, the second signal indicates either a manual depression of the hook switch 54, a replacement of the handset 32 to the handset-receiving portion 60, or a user-selection of the speakerphone key 66.

As indicated by block 330, a step of terminating the second call is performed in response to receiving the second signal. Preferably, the logic circuit 100 directs the switch 142 to provide an on-hook condition for the second telephone line 42 in this step.

As indicated by block 332, a step of uncoupling the second audio input device 24 and the second audio output device 26 from the second telephone line 42 is performed in response to receiving the second signal. Preferably, the logic circuit 100 opens the switch 124 to uncouple the second audio input device 24 from the transmit line 110, and opens the switch 130 to uncouple the second audio output device 26 from the receive line 120.

If the second signal is received from the hook switch 54, a step of coupling the first audio input device 20 to the first telephone line 40 is performed as indicated by block 334. Preferably, the logic circuit 100 closes the switch 102 to couple the first audio input device 20 to the transmit line 104. Thereafter, the first call is continued using the first audio input device 20 and the first audio output device 22.

If the second signal is received from the speakerphone key 66, steps indicated by blocks 336 and 340 are performed. Block 336 indicates a step of uncoupling the first audio output device 22 from the first telephone line 40. In this step, the logic circuit 100 opens the switch 112 to uncouple the first audio output device 22 from the receive line 114. Block 340 indicates a step of coupling the second audio input device 24 and the second audio output device 26 to the first telephone line 40. In this step, the logic circuit 100 closes the switches 122 and 126. Thereafter, the first call is continued using the second audio input device 24 and the second audio output device 26.

It is noted that the herein-described methods can be directed by a computer-readable storage medium having computer-readable data. The computer-readable storage medium can include either a magnetic storage medium such as a magnetic disk, an electronic storage medium such as a memory, or an optical storage medium such as an optical disk. The logic circuit 100 or a like processor can be responsive to the computer-readable data to perform the herein-described methods.

Thus, there has been described herein a concept, as well as several embodiments including preferred embodiments of telephone terminal apparatus and methods.

Because the various embodiments of the present invention allow an in-process, first telephone call to be placed in a passive, monitor mode so that a concurrent second telephone call can be placed, they provide a significant improvement in allowing an end user to manage periods of being either on-hold or a passive participant in the first telephone call. The end user can conduct the second telephone call while concurrently monitoring the first telephone call.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising the steps of:
   providing a telephone apparatus having a first audio input device, a second audio input device, a first audio output device, and a second audio output device;
   coupling the first audio input device and the first audio output device to a first telephone line;
   receiving a first signal;
   attenuating the coupling between the first audio input device and the first telephone line in response to receiving the first signal; and
   coupling the second audio input device and the second audio output device to a second telephone line in response to receiving the first signal.

2. The method of claim 1 wherein the first signal is based upon a hook switch signal.

3. The method of claim 1 wherein the first audio input device and the first audio output device provide a hands-free audio interface to the telephone apparatus.

4. The method of claim 3 wherein the second audio input device and the second audio output device are associated with a handset of the telephone apparatus.

5. The method of claim 1 wherein the step of attenuating the coupling between the first audio input device and the first telephone line includes muting the first audio input device.

6. The method of claim 1 further comprising the steps of:
   receiving a second signal; and
   modifying the coupling between the first audio input device and the first telephone line upon receiving the second signal.

7. The method of claim 6 further comprising the step of uncoupling the second audio input device and the second audio output device from the second telephone line upon receiving the second signal.

8. The method of claim 1 wherein the second telephone line comprises an on-demand line triggered upon receiving the first signal.

9. The method of claim 1 wherein the first signal is received during a first call associated with the first telephone line, the method further comprising the step of placing a second call using the second telephone line upon receiving the first signal.

10. A telephone apparatus comprising:
    a first audio input device;
    a second audio input device;
    a first audio output device;
    a second audio output device; and
    a telephone circuit to couple the first audio input device and the first audio output device to a first telephone line, the telephone circuit to attenuate the coupling between the first audio input device and the first telephone line and to couple the second audio input device and the second audio output device to a second telephone line in response to receiving a first signal.

11. The telephone apparatus of claim 10 further comprising a hook switch in communication with the telephone circuit to generate the first signal.

12. The telephone apparatus of claim 10 wherein the first audio input device and the first audio output device provide a hands-free audio interface.

13. The telephone apparatus of claim 12 wherein the second audio input device and the second audio output device are associated with a handset.

14. The telephone apparatus of claim 10 wherein the telephone circuit attenuates the coupling between the first audio input device and the first telephone line by muting the first audio input device.

15. The telephone apparatus of claim 10 wherein the telephone circuit is operative to modify the coupling between the first audio input device and the first telephone line upon receiving a second signal.

16. The telephone apparatus of claim 15 wherein the telephone circuit is operative to uncouple the second audio input device and the second audio output device from the second telephone line upon receiving the second signal.

17. The telephone apparatus of claim 10 wherein the second telephone line comprises an on-demand line triggered by the telephone circuit upon receiving the first signal.

18. The telephone apparatus of claim 10 wherein the first signal is received during a first call associated with the first telephone line, the telephone apparatus further comprising a dialing interface for placing a second call using the second telephone line upon receiving the first signal.

19. An article of manufacture comprising:
    a computer-readable storage medium; and
    computer-readable data stored by the computer-readable storage medium, the computer-readable data to direct a processor to initiate steps of coupling a first audio input device and a first audio output device to a first telephone line, attenuating the coupling between the first audio input device and the first telephone line in response to receiving a first signal, and coupling a second audio input device and a second audio output device to a second telephone line in response to receiving the first signal.

20. The article of manufacture of claim 19 wherein the step of attenuating the coupling between the first audio input device and the first telephone line includes muting the first audio input device.

21. A method comprising the steps of:
    providing a telephone apparatus having a first audio output device, a second audio output device, and an audio input device;
    coupling the audio input device and the second audio output device to a first telephone line;
    receiving a first signal;
    uncoupling the audio input device and the second audio output device from the first telephone line in response to receiving the first signal;
    coupling the first audio output device to the first telephone line in response to receiving the first signal;
    coupling the audio input device and the second audio output device to a second telephone line in response to receiving the first signal;
    receiving a second signal;
    uncoupling the audio input device and the second audio output device from the second telephone line upon receiving the second signal;

uncoupling the first audio output device from the first telephone line upon receiving the second signal; and recoupling the audio input device and the second audio output device to the first telephone line upon receiving the second signal.

22. The method of claim 21 wherein the first signal is based upon a hook switch signal.

23. The method of claim 21 wherein the first audio output device provides a hands-free audio interface to the telephone apparatus.

24. The method of claim 23 wherein the audio input device and the second audio output device are associated with a handset of the telephone apparatus.

25. The method of claim 23 wherein the first signal is based upon a signal generated by a speakerphone control.

26. A method comprising the steps of:
providing a telephone apparatus having a first audio output device, a second audio output device, a first audio input device, and a second audio input device;
coupling the first audio input device and the first audio output device to a first telephone line;
receiving a first signal;
uncoupling the first audio input device and the first audio output device from the first telephone line in response to receiving the first signal;
coupling the second audio output device to the first telephone line in response to receiving the first signal;
coupling the first audio input device and the first audio output device to a second telephone line in response to receiving the first signal;
receiving a second signal;
uncoupling the first audio input device and the first audio output device from the second telephone line upon receiving the second signal; and
coupling the second audio input device to the first telephone line upon receiving the second signal.

27. The method of claim 21 wherein the second telephone line comprises an on-demand line triggered upon receiving the first signal.

28. The method of claim 21 wherein the first signal is received during a first call associated with the first telephone line, the method further comprising the step of placing a second call using the second telephone line upon receiving the first signal.

29. A telephone apparatus comprising:
a first audio output device;
a second audio output device;
an audio input device; and
a telephone circuit to couple the audio input device and the second audio output device to a first telephone line, the telephone circuit responsive to a first signal to uncouple the audio input device and second audio output device from the first telephone line, to couple the first audio output device to the first telephone line, and to couple the audio input device and the second audio output device to a second telephone line;
wherein the telephone circuit is responsive to a second signal to uncouple the audio input device and the second audio output device from the second telephone line, to uncouple the first audio output device from the first telephone line, and to recouple the audio input device and the second audio output device to the first telephone line.

30. The telephone apparatus of claim 29 further comprising a hook switch in communication with the telephone circuit to generate the first signal.

31. The telephone apparatus of claim 29 wherein the first audio output device provides a hands-free audio interface.

32. The telephone apparatus of claim 31 wherein the audio input device and the second audio output device are associated with a handset.

33. The telephone apparatus of claim 31 further comprising a speakerphone control in communication with the telephone circuit to generate the first signal.

34. A telephone apparatus comprising:
a first audio output device;
a second audio output device;
a first audio input device;
a second audio input device; and
a telephone circuit to couple the first audio input device and the first audio output device to a first telephone line, the telephone circuit responsive to a first signal to uncouple the first audio input device and first audio output device from the first telephone line, to couple the second audio output device to the first telephone line, and to couple the first audio input device and the first audio output device to a second telephone line;
wherein the telephone circuit is responsive to a second signal to uncouple the first audio input device and the first audio output device from the second telephone line, and to couple the second audio input device to the first telephone line.

35. The telephone apparatus of claim 29 wherein the second telephone line comprises an on-demand line triggered upon receiving the first signal.

36. The telephone apparatus of claim 29 wherein the first signal is received during a first call associated with the first telephone line, the telephone apparatus further comprising a dialing interface for placing a second call using the second telephone line upon receiving the first signal.

37. An article of manufacture comprising:
a computer-readable storage medium; and
computer-readable data stored by the computer-readable storage medium, the computer-readable data to direct a processor to initiate steps of coupling an audio input device and an audio output device to a first telephone line, uncoupling the audio input device and the audio output device from the first telephone line in response to receiving a first signal, coupling another audio output device to the first telephone line in response to receiving the first signal, coupling the audio input device and the audio output device to a second telephone line in response to receiving the first signal, uncoupling the audio input device and the second audio output device from the second telephone line in response to receiving a second signal, uncoupling the first audio output device from the first telephone line in response to receiving the second signal, and recoupling the audio input device and the second audio output device to the first telephone line in response to receiving the second signal.

38. A telephone apparatus comprising:
a hands-free audio interface having a first audio input device and a first audio output device;
a handset having a second audio input device and a second audio output device;
a hook switch;
a telephone circuit to couple the first audio input device and the first audio output device to a first telephone line, the telephone circuit responsive to a first signal from the hook switch to modify the coupling between the first audio input device and the first telephone line and to couple the second audio input device and the second audio output device to a second telephone line, wherein the first signal is received during a first call associated with the first telephone line; and a dialing interface for placing a second call using the second telephone line, the second call being placed after receiving the first signal;

wherein the telephone circuit is responsive to a second signal from the hook switch to modify the coupling between the first audio input device and the first telephone line and to uncouple the second audio input device and the second audio output device from the second telephone line.

39. A telephone apparatus comprising:

a hands-free audio interface having a first audio input device and a first audio output device;

a handset having a second audio input device and a second audio output device;

a telephone circuit to couple the second audio input device and the second audio output device to a first telephone line, the telephone circuit responsive to a first signal to uncouple the second audio input device and the second audio output device from the first telephone line, to couple the first audio output device to the first telephone line, and to couple the second audio input device and the second audio output device to a second telephone line, wherein the first signal is received during a first call associated with the first telephone line; and a dialing interface for placing a second call using the second telephone line, the second call being placed after receiving the first signal;

wherein the telephone circuit is responsive to a second signal to uncouple the second audio input device and the second audio output device from the second telephone line, to uncouple the first audio output device from the first telephone line, and to recouple the second audio input device and the second audio output device to the first telephone line.

40. A telephone apparatus comprising:

a hands-free audio interface having a first audio input device and a first audio output device;

a handset having a second audio input device and a second audio output device;

a telephone circuit to couple the second audio input device and the second audio output device to a first telephone line, the telephone circuit responsive to a first signal to uncouple the second audio input device and the second audio output device from the first telephone line, to couple the first audio output device to the first telephone line, and to couple the second audio input device and the second audio output device to a second telephone line, wherein the first signal is received during a first call associated with the first telephone line; and a dialing interface for placing a second call using the second telephone line, the second call being placed after receiving the first signal;

wherein the telephone circuit is responsive to a second signal to uncouple the second audio input device and the second audio output device from the second telephone line, and to couple the first audio input device to the first telephone line during the first call.

41. An article of manufacture comprising:

a computer-readable storage medium; and computer-readable data stored by the computer-readable storage medium, the computer-readable data to direct a processor to initiate steps of coupling a first audio input device and a first audio output device to a first telephone line, uncoupling the first audio input device and the first audio output device from the first telephone line in response to receiving a first signal, coupling a second audio output device to the first telephone line in response to receiving the first signal, coupling the first audio input device and the first audio output device to a second telephone line in response to receiving the first signal, uncoupling the first audio input device and the first audio output device from the second telephone line in response to receiving a second signal, and coupling the second audio input device to the first telephone line in response to receiving the second signal.

* * * * *